United States Patent
Sharma et al.

(10) Patent No.: US 10,402,929 B2
(45) Date of Patent: Sep. 3, 2019

(54) SIGNAL PROCESSORS AND METHODS FOR ESTIMATING TRANSFORMATIONS BETWEEN SIGNALS WITH LEAST SQUARES

(71) Applicant: Digimarc Corporation, Beaverton, OR (US)

(72) Inventors: Ravi K. Sharma, Portland, OR (US); John D. Lord, West Linn, OR (US); Robert G. Lyons, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/959,992

(22) Filed: Apr. 23, 2018

(65) Prior Publication Data
US 2018/0308193 A1 Oct. 25, 2018

Related U.S. Application Data

(63) Continuation of application No. 14/936,359, filed on Nov. 9, 2015, now Pat. No. 9,953,390, which is a
(Continued)

(51) Int. Cl.
*G06T 1/00* (2006.01)
*G06T 3/00* (2006.01)
(Continued)

(52) U.S. Cl.
CPC ........... *G06T 1/0064* (2013.01); *G06F 1/02* (2013.01); *G06K 9/6206* (2013.01);
(Continued)

(58) Field of Classification Search
CPC ... G06T 1/0021; G06T 1/0042–1/0064; G06T 3/00–3/0006; G06T 3/0056
See application file for complete search history.

(56) References Cited

U.S. PATENT DOCUMENTS

| 3,987,243 A | 10/1976 | Schwartz |
| 5,756,990 A | 5/1998 | Watkins |

(Continued)

FOREIGN PATENT DOCUMENTS

| EP | 1173001 A2 | 1/2002 |
| EP | 2612442 B1 | 7/2013 |

(Continued)

OTHER PUBLICATIONS

Fitzgibbon, A. W., Pilu, M and Fischer, R. B.: "Direct least squares fitting of ellipses", Department of Artificial Intelligence, The University of Edinburgh, Jan. 1996.
(Continued)

*Primary Examiner* — Matthew D Sandifer
(74) *Attorney, Agent, or Firm* — Digimarc Corporation

(57) ABSTRACT

Signal processing devices and methods estimate transforms between signals using a least squares technique. From a seed set of transform candidates, a direct least squares method applies a seed transform candidate to a reference signal and then measures correlation between the transformed reference signal and a suspect signal. For each candidate, update coordinates of reference signal features are identified in the suspect signal and provided as input to a least squares method to compute an update to the transform candidate. The method iterates so long as the update of the transform provides a better correlation. At the end of the process, the method identifies a transform or set of top transforms based on a further analysis of correlation, as well as other results.

12 Claims, 12 Drawing Sheets

Related U.S. Application Data continuation of application No. 13/224,608, filed on Sep. 2, 2011, now Pat. No. 9,182,778.

(60) Provisional application No. 61/380,180, filed on Sep. 3, 2010.

(51) Int. Cl.
  *G06K 9/62* (2006.01)
  *G06F 1/02* (2006.01)
(52) U.S. Cl.
  CPC .......... *G06T 1/0021* (2013.01); *G06T 3/0006* (2013.01); *G06T 3/0056* (2013.01)

(56) References Cited

U.S. PATENT DOCUMENTS

| | | | |
|---|---|---|---|
| 5,949,055 | A | 9/1999 | Fleet |
| 6,408,082 | B1* | 6/2002 | Rhoads ............... G06K 7/1417 382/100 |
| 6,525,302 | B2 | 2/2003 | Dowski |
| 6,535,617 | B1 | 3/2003 | Hannigan |
| 6,671,386 | B1* | 12/2003 | Shimizu ............... G06T 1/0064 235/382 |
| 7,313,249 | B2 | 12/2007 | Fletcher |
| 8,301,453 | B2* | 10/2012 | Sharma ............... G06T 1/0064 704/270 |
| 8,750,560 | B2 | 6/2014 | Sharma |
| 8,867,860 | B2 | 10/2014 | Lyons |
| 9,182,778 | B2 | 11/2015 | Sharma |
| 9,466,307 | B1 | 10/2016 | Sharma |
| 9,652,821 | B2 | 5/2017 | Sharma |
| 9,836,807 | B2 | 12/2017 | Lyons |
| 9,953,390 | B2 | 4/2018 | Sharma |
| 2002/0106104 | A1 | 8/2002 | Brunk |
| 2002/0172396 | A1 | 11/2002 | Stach |
| 2003/0072468 | A1 | 4/2003 | Brunk |
| 2003/0081810 | A1 | 5/2003 | Bradley |
| 2003/0123698 | A1 | 7/2003 | Murakami |
| 2003/0133589 | A1* | 7/2003 | Deguillaume ....... G06K 9/6211 382/100 |
| 2004/0001608 | A1 | 1/2004 | Rhoads |
| 2004/0105569 | A1* | 6/2004 | Sharma ............... G06T 1/0064 382/100 |
| 2004/0250078 | A1 | 12/2004 | Stach |
| 2005/0111760 | A1 | 5/2005 | Lal |
| 2006/0087458 | A1 | 4/2006 | Rodigast |
| 2006/0120583 | A1 | 6/2006 | Dewaele |
| 2007/0092159 | A1 | 4/2007 | Larkin |
| 2007/0154061 | A1 | 7/2007 | Sharma |
| 2008/0199044 | A1 | 8/2008 | Tsurumi |
| 2009/0174638 | A1 | 7/2009 | Brown |
| 2009/0285446 | A1* | 11/2009 | Stach ............... G06T 1/0064 382/100 |
| 2010/0014705 | A1 | 1/2010 | Gustafson |
| 2011/0044494 | A1 | 2/2011 | Bradley |
| 2012/0076435 | A1* | 3/2012 | Sharma ............... G06T 1/0064 382/277 |
| 2012/0078989 | A1 | 3/2012 | Sharma |
| 2012/0082398 | A1* | 4/2012 | Lyons ............... G06T 1/0064 382/276 |
| 2015/0106416 | A1 | 4/2015 | Lyons |
| 2016/0132986 | A1 | 5/2016 | Sharma |
| 2016/0188972 | A1 | 6/2016 | Lyons |
| 2017/0193628 | A1 | 7/2017 | Sharma |
| 2017/0345126 | A1 | 11/2017 | Sharma |

FOREIGN PATENT DOCUMENTS

| | | |
|---|---|---|
| EP | 3396621 A1 | 10/2018 |
| JP | 2008235964 | 10/2008 |
| JP | 2009290878 | 12/2009 |

OTHER PUBLICATIONS

PCT/US11/50250 Search Report and Written Opinion dated Dec. 23, 2011.
U.S. Appl. No. 12/125,840, filed May 22, 2008.
Lohmann, 'Matched Filtering with Self-Luminous Objects', Mar. 1968, Applied Optics, vol. 7, issue 3, p. 561-563.
Pereira et al., 'Robust Template Matching for Affine Resistant Image Watermarks,' IEEE Trans. on Image Processing, vol. 9, No. 6, Jun. 2000, pp. 1123-1129.
O'Ruanaidh et al., 'Rotation, Scale and Translation Invariant Spread Spectrum Digital Image Watermarking,' Signal Processing 66, May 1, 1998, pp. 303-317.
O'Ruanaidh et al., "Phase Watermarking of Digital Images", Sep. 19, 1996, IEEE Int. Conf. on Image Processing, 1996. Proceedings, vol. 3, p. 239-242.
Cox, et al., 'Secure Spread Spectrum Watermarking for Multimedia,' IEEE Trans. Image Process., 1997, 6, (12), pp. 1673-1687.
Fletcher P A et al, 'Direct Embedding and Detection of RST Invariant Watermarks', Security in Communication Networks : Third International Conference ; Revised Papers / SCN 2002, Amalfi, Italy, Sep. 11-13, 2002; [Lecture Notes in Computer Science , ISSN 0302-9743], Springer Verlag, DE, (Oct. 9, 2003), vol. 2578, doi:10.1007/3-540-36415-3_9, ISBN 978-3-540-24128-7, pp. 129-144, XP001188234.
Hans Oltmans, 'Secure graphical data storage by full spectrum image coding', Proceedings of SPIE, US, (Feb. 2, 2006), vol. 6075, doi:10.1117/12.640934, ISSN 0277-786X, ISBN 978-1-62841-839-2, XP055224663.
Chen et al., "A robust watermarking scheme using phase shift keying with the combination of amplitude boost and low amplitude block selection", Apr. 2005, Elsevier, Pattern Recognition, vol. 38, iss. 4, p. 587-598.
Supplemental Search Report dated Nov. 10, 2015 in European Patent Application No. EP11822684.4.
First Office Action dated Aug. 5, 2015 in Chinese Patent Application No. 201180052657.7.
Notice of Reasons for Rejection in JP2013527327, dated Apr. 5, 2016.
Summons to Attend Oral Proceedings in European Application No. 11822684.4 dated May 22, 2017.
Anonymous: "Orientation (geometry)—Wikipedia", Jul. 3, 2010 (Jul. 3, 2010), XP055365783, Retrieved from the Internet: URL:https://en.wikipedia.org/w/index.php?title=Orientation_(geometry)&oldid=3714 77791 [retrieved on Apr. 9, 2017], cited by the EPO in the above referenced Summons.
U.S. Appl. No. 14/825,014, filed Aug. 12, 2015.
Oct. 6, 2016 Office Action in U.S. Appl. No. 14/825,014, filed Aug. 12, 2015.
Mar. 28, 2017 Amendment in U.S. Appl. No. 14/825,014, filed Aug. 12, 2015.
Office Action dated Mar. 29, 2016, in CN201180052657.7.
Office Action dated Oct. 9, 2016 in CN201180052657.7.
Amended Claims for CN20118005657.7.
Holter, "The Optimal Weights of a Maximum Ratio Combiner using an Eigenfilter Approach", Norwegian University of Science and Technology Department of Telecommunications. 2002.
Macleod, 'Fast Nearly ML Estimation of the Parameters of Real or Complex Single Tones or Resolved Multiple Tones', IEEE Transactions on Signal Processing, vol. 46 No. 1, Jan. 1998.
Quinn, "Estimation of Frequency, Amplitude, and Phase from the DFT of a Time Series", IEEE Transactions on Signal Processing, vol. 45, No. 3, Mar. 1997.
Quinn, 'Estimating Frequency by Interpolation Using Fourier Coefficients,' May 1994.
Examination Report dated Sep. 27, 2016 in European Patent Application No. EP11822684.4.
Search Report dated Sep. 28, 2018 in European Patent Application No. EP18159735.2.

* cited by examiner

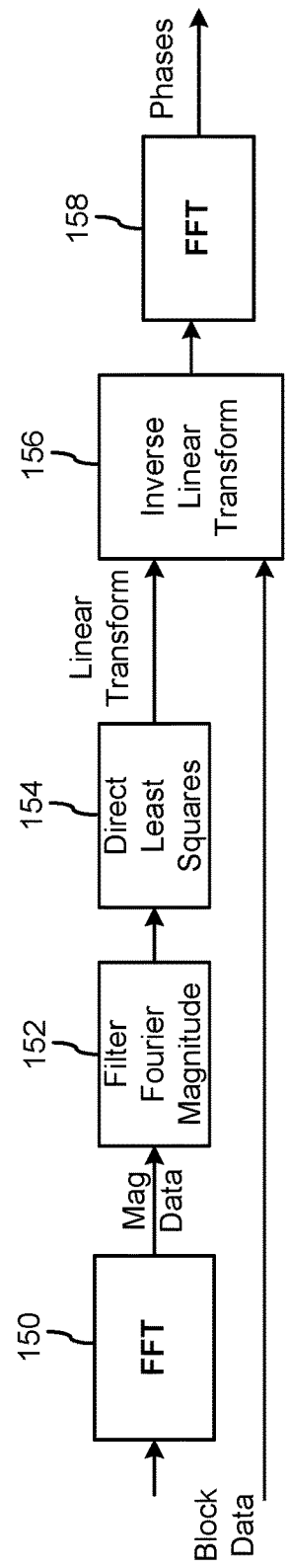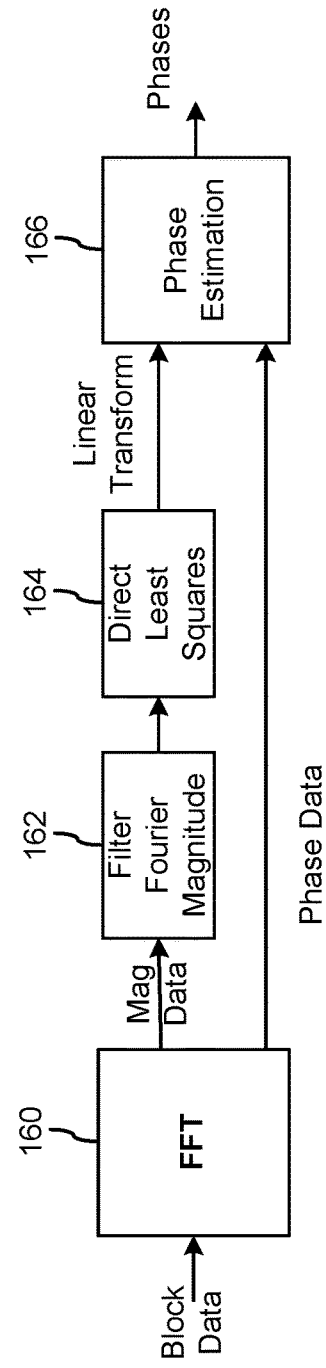
Fig. 5
Fig. 6

$$E_0[x_0, y_0] = \frac{1}{M} \sum_{i=1}^{M} \left\| e^{j(\theta'_i - \theta_i)} - e^{-j\frac{2\pi(u_i x_0 + v_i y_0)}{N}} \right\|^2$$

Deviation between Measured Phase Difference and Expected Phase Difference at Frequency $(u_i, v_i)$ for translation offset $(x_0, y_0)$ 2D Phase Deviation value at translation offset $(x_0, y_0)$ for zero-degree orientation Measured Phase Difference at Frequency $(u_i, v_i)$ Expected Phase Difference at Frequency $(u_i, v_i)$ for translation offset $(x_0, y_0)$ N = Support length of signal (e.g. 128)
M = Number of frequencies of interest (e.g. 64)
$x_0$ = horizontal translation offset ($x_0$ ranges from 0 to N-1)
$y_0$ = vertical translation offset ($y_0$ ranges from 0 to N-1)
$u_i$ = horizontal co-ordinate for the $i^{th}$ frequency of interest
$v_i$ = vertical co-ordinate for the $i^{th}$ frequency of interest
i = frequency index (i ranges from 1 to M)
$\|.\|^2$ = Euclidean distance measure
$E_0$ = 2D Phase Deviation surface for zero-degree orientation (for all values of $x_0$ and $y_0$)
$\theta_i$ = phase angle at frequency i for the reference signal
$\theta'_i$ = phase angle at frequency i for the suspect signal

Fig. 14

SIGNAL PROCESSORS AND METHODS FOR ESTIMATING TRANSFORMATIONS BETWEEN SIGNALS WITH LEAST SQUARES

RELATED APPLICATION DATA

This application is a continuation of U.S. application Ser. No. 14/936,359, filed Nov. 9, 2015 (now U.S. Pat. No. 9,953,390) which is a continuation of U.S. application Ser. No. 13/224,608, filed Sep. 2, 2011 (now U.S. Pat. No. 9,182,778), which claims benefit of Ser. No. 61/380,180 filed Sep. 3, 2010.

TECHNICAL FIELD

The invention relates to signal processing, and specifically signal processing for determining transformations between signals, for use in signal detection, identification, signal matching and recognition applications, among others.

BACKGROUND AND SUMMARY

There are a wide variety of signal processing applications in which the affine transformation between a suspect signal and a reference signal need to be computed accurately and efficiently. This is particularly the case for signal detection and recognition applications for images, and it applies to other types of signals as well. In the case of signal detection and signal recognition, the objective for the computing device is to determine whether a particular reference signal is present in a suspect signal. This objective is more difficult when the reference signal is present, yet is distorted by a transform of the coordinate space. In image processing, such transformations are caused by manipulation of the reference signal through image editing (magnification, shrinking, rotation, digital sampling (and re-sampling), format conversions, etc.). When the reference images or the objects they represent are captured via a camera from a different reference point relative to their original state, the result is a suspect image, which contains the reference signal, yet in a transformed state. Unless there is a means to determine and compensate for the affine transformation of the reference signal, it is more difficult to accurately detect, recognize or match the reference signal with its counterpart in the suspect image.

This signal processing problem is important to a variety of fields. Some examples include machine vision, medical imagery analysis, object and signal recognition, biometric signal analysis and matching (e.g., facial, voice, iris/retinal, fingerprint matching), surveillance applications, etc. In these applications, the objective may be to detect or match an input suspect signal with one particular reference signal, or match it with many different reference signals (such as in database searching in which a query includes a suspect signal (a probe or template) that is matched against a reference database of signals). Various types of images and sounds can be identified using signal recognition and detection techniques. These include recognition based on signal attributes that are an inherent in signals, as well as recognition based on signals particularly embedded in another signal to provide an auxiliary data carrying capacity, as in the case of machine readable codes like bar codes and digital watermarks.

In recent years, computing devices are becoming increasingly equipped with sensors of various kinds, including image and audio sensors. To give these devices the ability to interact with the world around them, they need to be able to recognize and identify signals that they capture through the sensors.

The advances of electronics have extended these advanced sensory functions beyond special purpose devices like machine vision equipment, surveillance and exploration equipment, and medical imaging tools, to consumer electronics devices, like personal computers and mobile telephone handsets. The signals captured in these devices are often distorted by transformations. If these transformations can be approximated by affine transformations or at least locally affine transformations, then it may be possible to determine the affine transformation (including local affine transform in a portion of the signal) that most closely matches the suspect with a reference signal.

The affine transformation that aligns a reference signal with its counterpart in a suspect signal can be expressed as $y=Ax+b$, where x and y are vectors representing the reference and transformed version of the reference signal, A is a linear transform matrix, and b is translation. The affine transformation generally comprises a linear transformation (rotation, scaling or shear) and translation (i.e. shift). The linear transformation matrix, for two dimensional signals, is a two by two matrix ($2\times2$) of parameters that define rotation, scale and shear. The translation component is a two by one ($2\times1$) matrix of parameters that define the horizontal and vertical shift. The translation is related to the phase shift as described in more detail below. Thus, the process of aligning two signals can include both approximations of the linear transform as well as the translation. The linear transform is sometimes approximated by determining signal correlation operations, which often employ Fourier transforms and inverse Fourier transforms. The translation component is approximated by determining phase shift (e.g., using signal correlation) in a Fourier representation.

When signal transforms are computed in digital computing environments of general purpose processing units or special purpose digital logic circuits, a number of challenges arise. Some of these challenges include the errors caused by representing signals in discrete digital logic. Not only is quantization error introduced as analog signals are sampled through sensors, but also as these signals are re-sampled when transformed into different coordinate spaces (e.g., Fourier and inverse Fourier transforms). Additional errors are introduced in the precision or limits on precision of the circuitry used to store the discrete values of the signal and associated transform parameters. Another challenge is that signal recognition and signal alignment typically involves transforms and inverse transforms, which in addition to introducing errors, are computationally expensive to implement in hardware, require additional memory, and introduce memory bandwidth constraints as the need for read/write operations to memory increases as each value in the discrete signal is transformed, re-sampled, or approximated from neighboring sample values.

In view of these challenges, there is a need for methods to determine transforms between signals that are accurate, yet efficient to implement in digital computing environments. This includes more effective ways to estimate linear transforms as well as determining translation or phase shift.

One aspect of the invention is a method of determining a geometric transformation of an image. The method operates on an electronic image sampled from a physical object, with one or more processors programmed to execute the following method. The method starts with a seed set of candidate geometric transform parameters, which is distributed over a space of candidate geometric transform parameters. For each of the candidate geometric transform parameters, the method transforms coordinates of a digital watermark signal with the candidate geometric transform parameters to produce a transformed watermark signal at transformed watermark signal coordinates. The method then determines a measure of correlation between the transformed watermark signal and the electronic image, for each of the candidate geometric transform parameters. It then selects a subset of the candidate geometric transform parameters based on the measure of correlation.

This subset of candidates is then processed further to derive the geometric transformation of the image. For a selected candidate geometric transform parameter, the method determines peak locations within the electronic image that are within neighborhoods around the transformed watermark signal coordinates; updates locations of the transformed watermark signal coordinates to the peak locations; determines a geometric transform that maps the digital watermark signal to the updated locations; and determines correlation between the electronic image signal and the digital watermark signal, transformed by the geometric transform. If the processing improves correlation between the image and the transformed digital watermark, the method may continue to refine the geometric transformation.

The method refines the geometric transform by determining peak locations within the electronic image that are within a neighborhood of corresponding transformed watermark signal coordinates, updates locations of the transformed watermark signal coordinates to the peak locations, determines a new geometric transform that maps the digital watermark signal to the updated locations, and determines whether correlation has increased between the electronic image signal and the digital watermark signal, transformed by the new geometric transform. The method may iterate this refinement processing so long as it yields a geometric transform that improves correlation.

Variants are implemented within a digital watermark detector as described and claimed.

One technology described in this disclosure is a method of computing a transformation between a discrete reference signal with a suspect signal using a direct least squares technique. The method provides a set of feature locations representing the discrete reference signal, and provides a seed set of initial transform parameters. The feature locations and transform parameters are represented as digital, electronic signals in an electronic memory. Using the seed set, the method computes a least squares minimization that finds linear transform candidates that minimize error when the linear transforms are used to align the feature locations of the discrete reference signal and corresponding feature locations in the suspect signal. This includes computing a measure of correlation corresponding to the linear transform candidates. The method evaluates the linear transform candidates for each of the seeds to identify a subset of the candidates representing refined estimates of linear transform candidates.

This disclosure also describes a direct least squares circuit. The circuit comprises a memory for storing a suspect signal representation. The circuit includes a correlation module for receiving a seed set of linear transform candidates and determining a correlation metric for each candidate as a measure of correlation between a reference signal and the suspect signal representation when the linear transform candidate is applied.

The circuit also includes a coordinate update module for determining feature locations within the suspect signal representation of a feature that corresponds to a feature of the reference signal at a location determined by applying the linear candidate transform. This module determines locations of components of a reference signal in the suspect signal and provides input to a least squares calculator to determine the transform between a reference signal and the suspect signal.

The circuit includes a least squares calculator for determining an updated linear transform for each of the candidates that provides a least squares fit between reference signal feature locations and the corresponding feature locations in the suspect signal determined by the coordinate update module. The circuit is implemented to use correlation metrics to identify the most promising linear transform candidates. For example, the circuit iterates through the process of updating the transform so long as the correlation metric shows signs of improvement in the transform's ability to align the reference and suspect signals.

Some embodiments employ a method of computing an estimate of phase of a transformed signal. This phase estimation method provides a set of feature locations representing a discrete reference signal, receives a suspect signal, and applies a transform to the reference signal to provide a set of transformed locations. It samples phase from the suspect signal at discrete sample locations in a neighborhood around the transformed locations. To these sampled phases, the method applies a point spread function to provide an estimate of phase of the suspect signal at locations corresponding to the transformed locations.

Phase estimation is implemented, for example, in a digital logic circuit comprising a memory for storing phase of a suspect signal and a transform module for transforming coordinates of a reference signal into transformed coordinate locations. The circuit also comprises a point spread function module for reading selected phase of the suspect signal from the memory at locations around a transformed coordinate location and applying a point spread function to the selected phase to provide an estimate phase.

Some embodiments further employ a method of computing an estimate of a translation offset between a reference and suspect signal. This method operates on a set of phase estimates of a suspect signal. For each element in an array of translation offsets, the method provides a set of expected phases of the reference signal at the translation offset. It computes a phase deviation metric for each of the set of expected and corresponding phase estimates at the translation offset, and computes a sum of the phase deviation metrics at the translation offset. This approach provides a phase deviation surface corresponding to the array of translation offsets. The method determines a peak in the phase deviation metrics for the array of translation offsets (e.g., in the phase deviation surface), wherein a location of the peak provides the estimate of the translation offset.

This phase deviation method is implemented, for example, in a phase deviation circuit. The phase deviation circuit comprises a memory for storing a set of phase estimates of a suspect signal and known phases of a reference signal. It also comprises a phase deviation module for computing a phase deviation metric for each of the set of known phases of the reference signal and corresponding phase estimates from the reference signal for an array of translation offsets, and for computing a sum of the phase deviation metrics at the translation offsets. The circuit comprises a peak determination module for determining a peak in the phase deviation metrics for the array of translation offsets. The location of the peak provides the estimate of the translation offset between the reference and suspect signals.

The above-summarized methods are implemented in whole or in part as instructions (e.g., software or firmware for execution on one or more programmable processors), circuits, or a combination of circuits and instructions executed on programmable processors.

Further features will become apparent with reference to the following detailed description and accompanying drawings.

BRIEF DESCRIPTION OF THE DRAWINGS

FIG. 5 is a block diagram of a illustrating a method to compute estimates of the phases of a suspect signal for which an approximation of a linear transform has been computed.

FIG. 6 is a block diagram showing an alternative method to compute estimates of the phases of the suspect signal.

FIG. 14 is a diagram illustrating a phase deviation equation based on a deviation metric.

DETAILED DESCRIPTION

Figure 1:
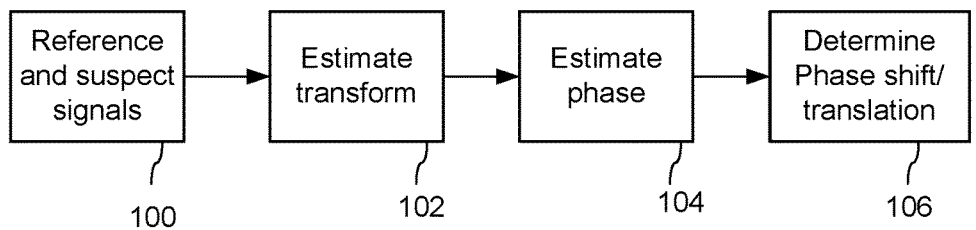
FIG. 1 is a block diagram illustrating an implementation of a process for determining a transformation between a reference and suspect signal.

FIG. 1 is a block diagram illustrating an implementation of a process for determining a transformation between a reference and suspect signal. We refer to this process as a transformation recovery process because it recovers a transformation of the reference signal from a suspect signal captured within a device. In particular, we have implemented this method to recover the transform required to align the suspect signal with the reference signal. The process takes as input a discrete representation of a known reference and the captured suspect signal 100 and determines an estimate of a transformation, which when applied to the reference signal, would approximate the suspect signal. The transformation recovery process is sub-divided into stages 102-106 in which the first stage provides an estimate of a transform (e.g., a linear transform described by 4-D vector of linear transform parameters (or 2 by 2 linear transform matrix)) and the subsequent stages refine the estimate by first estimating a phase of the reference signal as transformed by an estimated transform of stage 102 and then finding the phase and the translation in stage 106 (thus, providing two additional parameters of translation). In our particular implementation, stage 102 provides candidate linear transforms, each corresponding to a 2 by 2 linear transform matrix. The next two stages provide two dimensional (2D) translation (in vertical and horizontal directions), which when combined with the 2 by 2 linear transform matrix, provide affine transform candidates. In this context, the phase shift and translation are related quantities that are expressed in different domains—the phase shift as a change in phase angle of signal components in a Frequency domain such as a Fourier transform domain, and translation in the spatial (e.g., the spatial domain of an image) or temporal domain (time domain of time varying signals like audio). Each of the stages 102-106 includes novel elements independent of the other stages, and we explain these novel elements in more detail. These stages are implemented in a system to compute an affine transform between signals and provide additional advantages when used in combination as explained further below. The methods and associated hardware implementations have application in a variety of signal detection and object recognition and matching applications. We illustrate examples of the methods in the context of digital watermark detection, but the methods are not limited to this context.

The methods also apply to a variety of signal types. They are designed to operate on two dimensional content signals captured from sensors (e.g., images or video frames captured with cameras). The methods also apply to one dimensional as well as 2 or more dimensional signals. One implementation, in particular, is adapted to determine the geometric transformation of a reference signal in image content. The reference signal is in the form of a two dimensional image watermark signal that is embedded in a host image. The reference signal can be generalized to encompass a variety of signal types for different applications. As such, the software and hardware implementations have applications in a variety of signal processing applications, such as object recognition, pattern recognition and matching, content fingerprinting, machine vision, and other applications where transformations between signals are computed. Our methods are particularly adapted for processing of signals captured in sensors, and in particular, image sensors like CCD and CMOS arrays, of the type used in digital scanners, cameras, mobile telephone handsets, etc.

Figure 2:
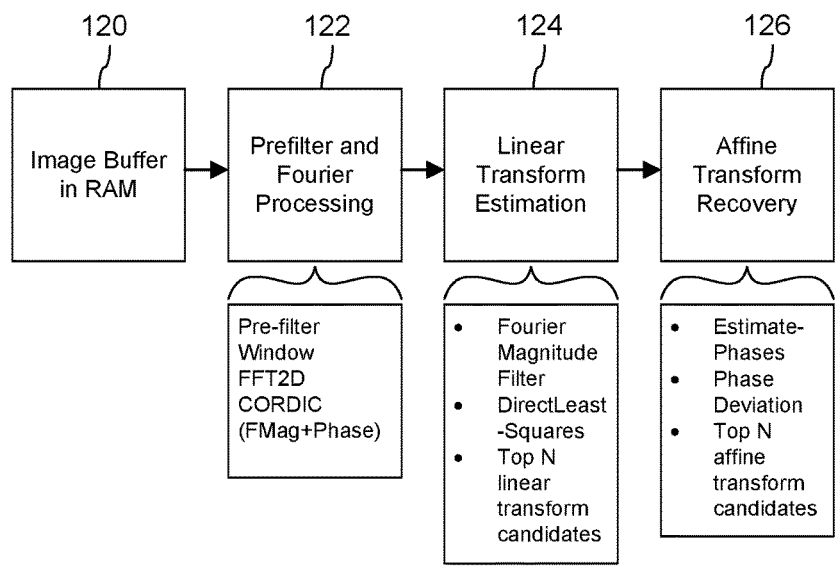
FIG. 2 is a diagram illustrating a hardware device that computes an affine transform between a reference and suspect signal.

As an example to provide context for the methods, we begin with an overview of watermark signal detection hardware. We then describe implementations of the individual stages. FIG. 2 is a diagram illustrating a hardware device that computes an affine transform between a reference and suspect signal. This particular design is adapted to recover the affine transform of an embedded two dimensional watermark signal. The design buffers portions of a captured and digitized electronic image in memory (RAM) 120 (the suspect image signal). A filter and Fourier transform processing module 122 filters the suspect image and computes a 2D Fourier transform. A linear transform estimation module 124 takes the discrete frequency representation of the suspect image and computes an estimate of a linear transform between a reference signal and the filtered suspect signal. Affine transform recovery module 126 uses the linear transform estimate, and reference and suspect signal representations to compute the phase/translation between the reference and suspect signal and so results in an affine transform which transforms the reference signal to the suspect signal.

The lower portion of FIG. 2 provides a break-down of sub-modules within modules 122-126. Implementations of these sub-modules are described further below.

The transform estimation of FIG. 1 can be implemented in a number of alternative ways. One approach is to perform a matched filter correlation between the reference and suspect signals. One such method for determining rotation and scale of a reference signal relative to a suspect signal is a Fourier-Mellin correlation. By converting both the suspect and reference signals to Fourier-Mellin coordinate space (a log polar coordinate space), the rotation and scale transform between the two signals is converted to translation shifts, enabling the application of matched filter correlation to find the location of a correlation peak, which corresponds to an estimate of the rotation and scale between the signals. Another is to perform a least squares method, and in particular, a direct least squares method. Below we describe implementations of least square methods. These are particularly useful for implementation in hardware, where the processing can be implemented in sequential pipelined hardware logic stages, and in software where the processing can be performed in parallel on special purpose hardware processing units such as, Graphics Processing Units (GPUs), Digital Signal Processors (DSPs) or multi core Central Processing Units (CPUs), to name a few.

Least Squares

Least Squares Technique

The least squares technique estimates a linear transform that yields the least square error (i.e., the maximum likelihood estimate), given an initial guess of the linear transform. Operations consist of multiplies and adds, and are hardware friendly.

Figure 3:
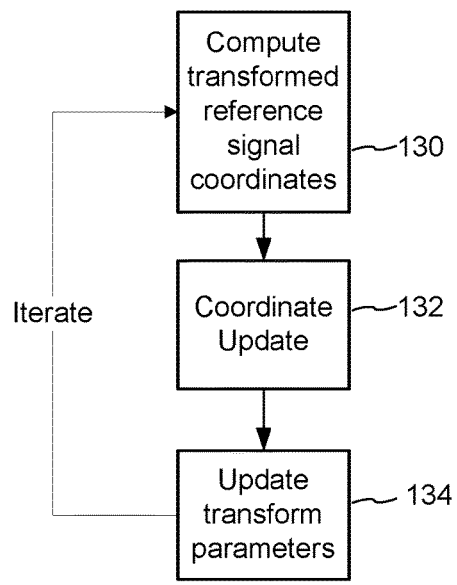
FIG. 3 is a flow diagram illustrating a least squares method that computes a best fit transform that aligns a reference signal with its counterpart in a suspect signal.

FIG. 3 is a flow diagram illustrating a least squares method. One implementation takes as input the coordinates for a set of reference locations (in either the frequency or spatial domain) and the corresponding set of coordinates for a set of transformed locations (again, either in the frequency or spatial domain). For the sake of illustration, we describe the technique for an implementation in which the reference locations correspond to features in the frequency domain, and in particular, peaks in the frequency domain.

This least squares method is performed iteratively and includes three steps for each iteration. These three steps are illustrated in FIG. 3 in processing blocks 130, 132, and 134:

Computation of transformed frequency coordinates 130—In this stage, the transformed frequency coordinates are computed using the initial transform and the original (i.e., non-transformed) frequency coordinates of the signal.

Coordinate update 132—in this step, more suitable locations for each transformed frequency is sought by searching the frequency magnitude plane for the peak value around a small neighborhood of the transformed frequency. At the end of this step, the coordinate of each transformed frequency is updated if a more suitable peak location is found for this frequency. The optimal frequency coordinates computed in this process result in locations that can no longer be simultaneously determined by a single linear transform.

Transform update 134—in this step, an updated linear transform is calculated from the updated coordinates using the least squares formulation. This updated transform is used as an initial guess for the next iteration. The least squares technique provides the transform that minimizes the squared error between the original and transformed coordinates. In particular, it provides the transform that minimizes, in the sense of least squared error, the sum of the location errors. The computation of the new transform from the errors is implemented as follows:

A measure of correlation, called correlation strength, is computed for each iteration. The correlation strength metric can be used to determine early termination of iterations or to provide regularization.

In theory, the least squares technique can find the actual linear transform between a reference and suspect signal starting from any initial guess of the linear transform parameters. However, from a practical standpoint (to prevent the coordinate update from being overly complex), the initial guess of the linear transform parameters must be somewhat close to the actual linear transform. Consequently, the technique is sensitive to the initial guess.

The initial guess of the transform can be as simple as a rotation and scale pair.

This least squares method can determine any arbitrary linear transform (i.e., including rotation, scale, shear, and, differential scale).

Direct Least Squares (DLS)

DLS is an efficient application of the least squares technique to determine the linear transform between a suspect and a reference signal. Our particular implementation applies to images, and in particular, the suspect image is a watermarked image, and the reference signal is a watermark signal, which is assumed to be embedded in the watermarked image. The task, in this case, is to determine the linear transform between the original reference signal, which is known, and its counterpart which is assumed to be embedded in the suspect signal.

In DLS, the least squares technique is applied to a sparse set of initial guesses of the linear transform.

DLS requires fewer evaluations than a Fourier-Mellin type correlation, while providing a more accurate transform than Fourier-Mellin. As noted above, a correlation between reference and suspect signals in the Fourier-Mellin domain provides an estimate of rotation and scale. Least squares, in contrast, can provide any arbitrary linear transform (e.g., a 4D vector of linear transform parameters).

With DLS, the 4-dimensional space covered by the 2×2 linear transform matrix can be evaluated extremely efficiently with initial guesses spanning a sparse 2-dimensional subspace.

Each DLS evaluation uses the least squares technique, and is independent of other DLS evaluations on the 2D subspace. Therefore, DLS evaluations can be performed efficiently in hardware or on multi-core processor architectures. Each evaluation results in an estimated linear transform and a corresponding correlation strength value. Candidate linear transforms are identified as those transforms corresponding to the largest correlation strength values. One or more of these candidate linear transforms are processed further to recover the affine transform.

DLS allows the initial guesses to be arbitrarily spread around the 2D subspace. For example, if the initial guesses comprise rotation/scale pairs, the spacing along the rotation axis and the scale axis can be arbitrary. In comparison, the Fourier-Mellin approach requires the spacing in the scale axis to be logarithmic. The use of arbitrary spacing has two advantages—increased robustness and efficient computation. In the general case, the set of initial guesses are ideally selected such that they are uniformly distributed over a sparse subset of rotation and scale values. For example, a uniform spacing in the scale axis (uniform increments in scale) can be efficiently computed and also reduces noise artifacts. The ability of DLS to converge on the appropriate linear transform and the accuracy of the estimated transform is influenced by the number of initial guesses and the number of least squares iterations. Optimal values for these parameters are determined as a tradeoff between hardware cost, computational speed and desired robustness. A more sophisticated strategy consists of using a very sparse set of initial guesses in conjunction with an adaptive number of iterations. More iterations are performed for cases where the resulting transforms from successive iterations exhibit convergence. This strategy provides computational efficiency without sacrificing robustness.

In certain applications, the suspect signal may undergo a limited set of transformations. For example, the rotation may be restricted to a range between −30 and +30 degrees. In such situations, DLS evaluations are performed on a further restricted range of sparse initial guesses.

Due to noise and distortion, the linear transform estimated by DLS can be noisy. In our particular case, the transform is noisy when estimated from a single image block of an image with weak watermark signal. To reduce the noise in the estimated transform, we take advantage of characteristics of the DLS output. Recall that DLS results in an estimated linear transform and a correlation strength value for each initial guess. For a well-designed set of initial guesses, multiple initial guesses lead to similar linear transforms. In other words, the output linear transforms are clustered. To reduce noise in the linear transform estimate, clusters of linear transforms are identified, and their elements appropriately averaged. Appropriate averaging can be done by weighting each linear transform by some function (e.g. nonlinear function) of the correlation strength.

Figure 4:
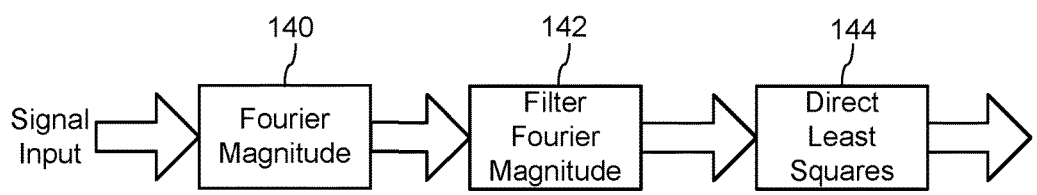
FIG. 4 is a block diagram of processing flow in a digital logic circuit implementation.

FIG. 4 is a block diagram of processing flow in a digital logic circuit implementation. A Fourier transform module 140 accesses the input signal (e.g., block of image data captured by an image sensor) from memory, and computes a Fourier transform and Fourier magnitude data. Fourier magnitude filter 142 filters the 2D Fourier magnitude data. One such filter is a non-linear filter that compares a sample value with each of its eight neighbors and replaces the sample value with an aggregate value based on these comparisons. In one implementation, the filter uses a ratio of the sample value to the average of its 8 neighbors (in the Fourier magnitude domain). The output of the filter is then a function (in this case, a nonlinear function) of this ratio. This filter is particularly useful in extracting reference signal features (e.g., in digital watermarking where the reference signal is embedded in the suspect signal). The output of the filter then forms the input to the direct least squares method.

Update Coordinates (Block 132 of FIG. 3)

The coordinate update process comprises a local search for a peak (or desired characteristic such as a corner or feature) around a small neighborhood surrounding the transformed location (frequency) of interest.

Neighborhoods are typically defined as a 3×3 or 2×2 region of samples or could be much larger depending on the problem domain and application.

If the peak or desired feature is in a different location than the transformed location, the coordinate of the transformed location is updated to this location The least squares method provides an estimate of the linear transform between the suspect and reference signals. To recover the complete affine transform, the phase shift (or the translation) between the two signals needs to be computed. One approach is to compute a phase correlation between a phase representation of both the reference and suspect signals, taking into account the linear transform. We have developed processing modules that are particularly advantageous in recovering the affine transform. These processing modules, as noted above in FIG. 1, are phase estimation and phase deviation.

Phase Estimation

Our phase estimation approach is advantageous because it calculates phases from the Fast Fourier Transform (FFT) of a transformed signal rather than performing the inverse transform of the image followed by an additional FFT to compute and extract the phases. Phase estimation uses the linear transform that the reference signal has undergone within the suspect signal. While direct least squares is illustrated as one method to compute this linear transform, there are other ways to compute it, such as using matched filters (e.g., the Fourier Mellin correlation to approximate the linear transform).

Highlighting this advantage, FIGS. 5 and 6 are block diagrams illustrating different methods of calculating phase information: one without phase estimation and the other with phase estimation. Both methods use direct least squares methods to estimate linear transforms between the signals. A first FFT is performed to obtain the magnitude information that the direct least squares technique operates on. The approach of FIG. 6 uses our phase estimation technique, while FIG. 5 performs an inverse linear transform followed by a second FFT to calculate the phases. Phase estimation avoids the extra processing of both the inverse linear transform and the second FFT.

Figure 7:
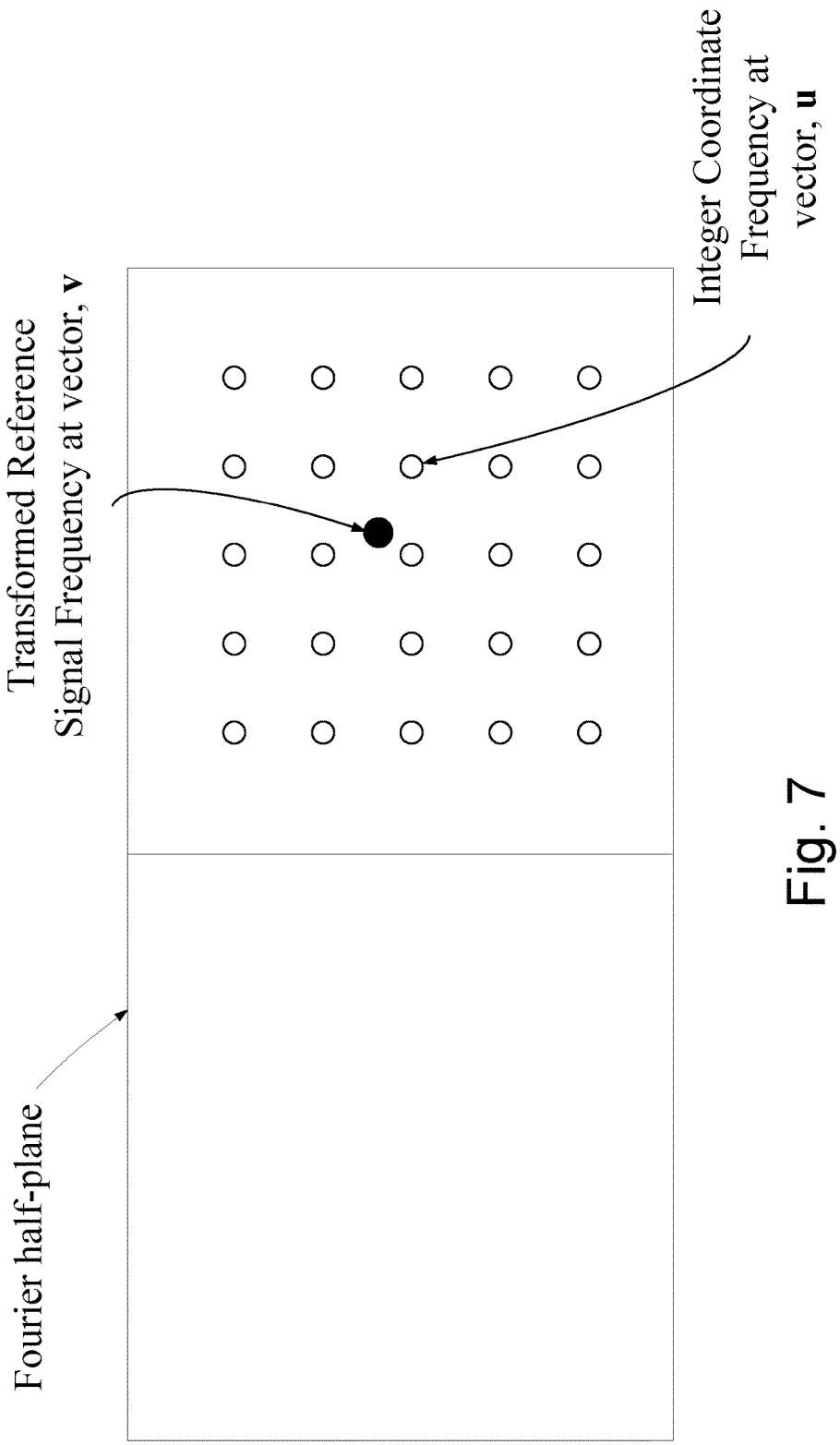
FIG. 7 is a diagram illustrating that the transformed frequency component of a discrete reference signal does not fall on integer coordinates in a Fourier domain, and as such, requires a phase estimation method to estimate phases from neighboring frequency locations.

FIG. 7 is a diagram illustrating the problem that phase estimation addresses. When the linear transform is applied to a reference signal coordinate, it likely does not map to a discrete coordinate. The phase estimation method provides an efficient approach to computing the phases at non-discrete (i.e., real valued) co-ordinate locations.

Figure 8:
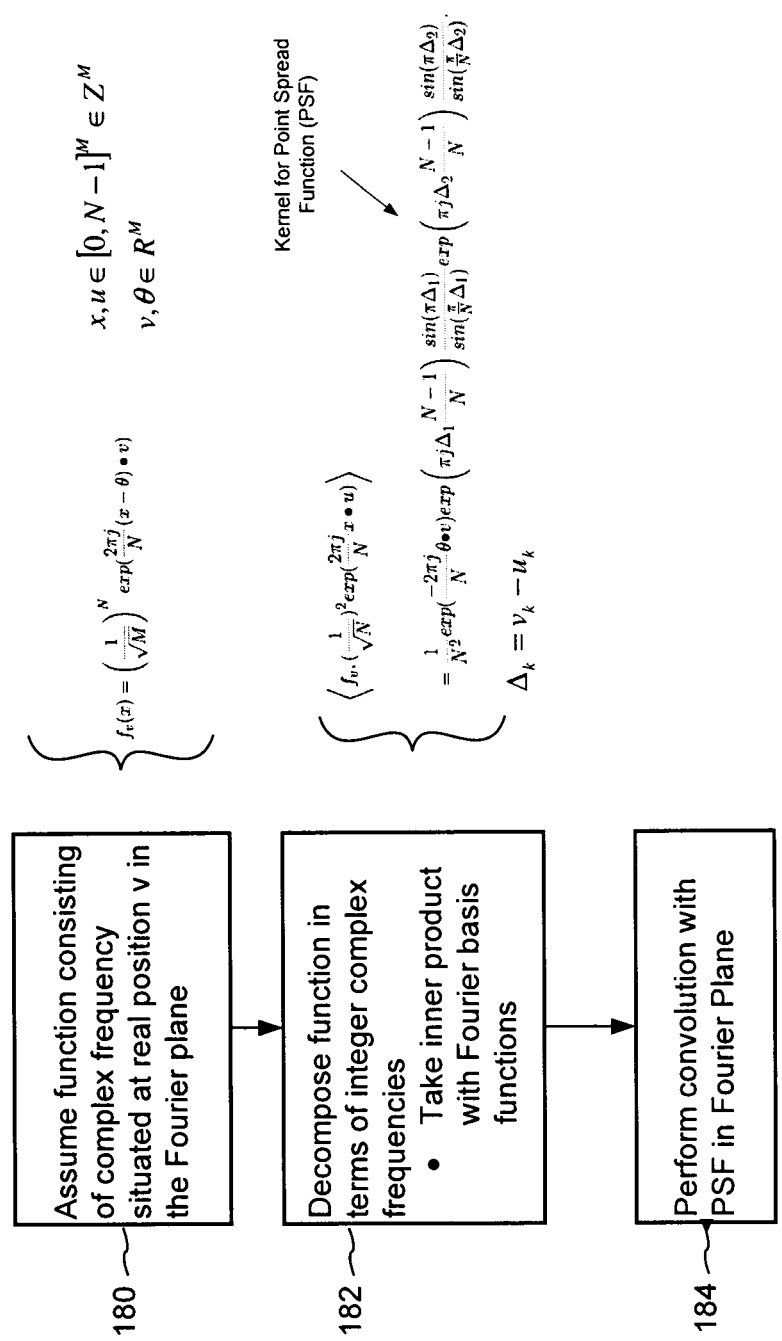
FIG. 8 is a diagram illustrating a process of deriving the phase estimation method and associated mathematics supporting the derivation.

To understand how phase estimation addresses the problem, we begin with a derivation of the phase estimation method. FIG. 8 is a diagram illustrating a process of deriving the phase estimation method and associated mathematics supporting the derivation. As illustrated in FIG. 7 and block 180 in FIG. 8, the first step in the derivation assumes a function consisting of complex frequency situated at real position v in the Fourier plane.

Block 182 of FIG. 8 and the corresponding mathematical expressions illustrate a derivation of a Point Spread Function (PSF) used for phase estimation. The PSF is derived by decomposing complex frequencies situated at real positions in the Fourier plane in terms of integer complex frequencies. This PSF is complex-valued.

As shown in block 184, the last step in the derivation performs a convolution with PSF in Fourier Plane. The inner product of block 182 of FIG. 8 is with respect to the Fourier basis functions—this provides the PSF. The PSF is then used in block 184 to convolve with the values in the Fourier plane.

Figure 9:
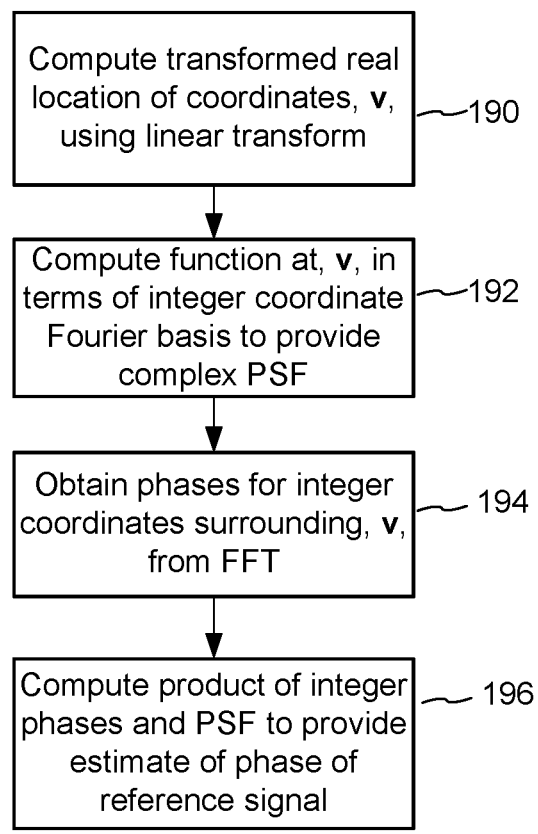
FIG. 9 is a flow diagram illustrating a phase estimation method to compute phases given a linear transform and a reference signal.

FIG. 9 is a flow diagram illustrating a phase estimation method to compute phases given a linear transform and a reference signal. There are two principal stages in our phase estimation process. In a first stage, the implementation transforms the known reference signal coordinates (in particular, a set of sinusoids at known frequency coordinates) according to a linear transform. In a second stage, the implementation uses the transformed coordinates and the phase information surrounding these coordinates in the suspect signal's frequency domain to obtain phase estimates of the transformed frequency coordinates. The inputs to this process are the discrete suspect signal, which is stored in memory in the form of a complex frequency plane from the 2D FFT, along with the assumed transform (e.g., the linear transform computed previously), and the reference signal's frequency specification (this is the set of known frequency locations of the sinusoids of the reference signal). For each real complex frequency, phase estimation applies the following steps a. Compute transformed real location (e.g., non-integral) of the frequency using the provided linear transform (block 190).

b. Express complex frequency at the real location in terms of integer-coordinate Fourier basis. This provides the complex PSF (block 192).

c. Obtain the phases for the integral frequencies surrounding the desired real frequency from the FFT of the suspect image block (block 194). The PSF is peaked at Delta=0, and so a non-integral peak shows up in a small neighborhood (as expected). In particular, the function (sin(pi Delta)/N sin(pi Delta/N)) has a peak at 0 (in the limit).

d. Compute the sum of products of the complex values at the integral frequencies with the corresponding complex values of the PSF (block 196). This gives the estimated phase at the real complex frequency.

The PSF values can be pre-computed and stored in a table for efficiency. In addition, the phases can also be quantized (to a few phase angles) for efficiency. The implementation of the first stage of phase estimation makes a transformation to move each frequency location of the reference signal to the appropriate "fractional" position between the discrete frequency samples. The characteristics of the transformed reference signal's phase are independent of the signal frequency. For each fractional frequency position, the PSF table contains pre-computed phase information for the nearest discrete frequency locations.

To simplify the computation, the implementation uses a limited resolution of the fractional frequency positions, between each integer frequency. The implementation uses this reduction in number of fractional frequency positions to further reduce the size of the PSF table. The PSF table contains pre-computed phase information only for each permitted fractional frequency position.

This PSF phase information is then re-used for all future estimations (in the 2nd stage of the process). In one particular implementation, the phase information is pre-computed and the values are stored in small discrete tables. The tables are the same for horizontal and vertical frequency directions, so the implementation accesses twice and combines the values to make the expected phase for a 2D frequency location.

Our phase estimation operations are efficient and hardware friendly. Besides eliminating the inverse transform and additional FFT, this approach does not require access to the suspect signal data (e.g., the input suspect image) as shown in the method of FIG. 5. Instead, it uses the frequency data of the suspect signal, which has already been computed, as shown in FIG. 6. Consequently, Phase estimation lends itself to a pipelined architecture in hardware.

In general, the phase estimation technique can be used to perform rotations or other transformations in the complex frequency domain, without first resorting to the spatial domain data.

Figure 10:
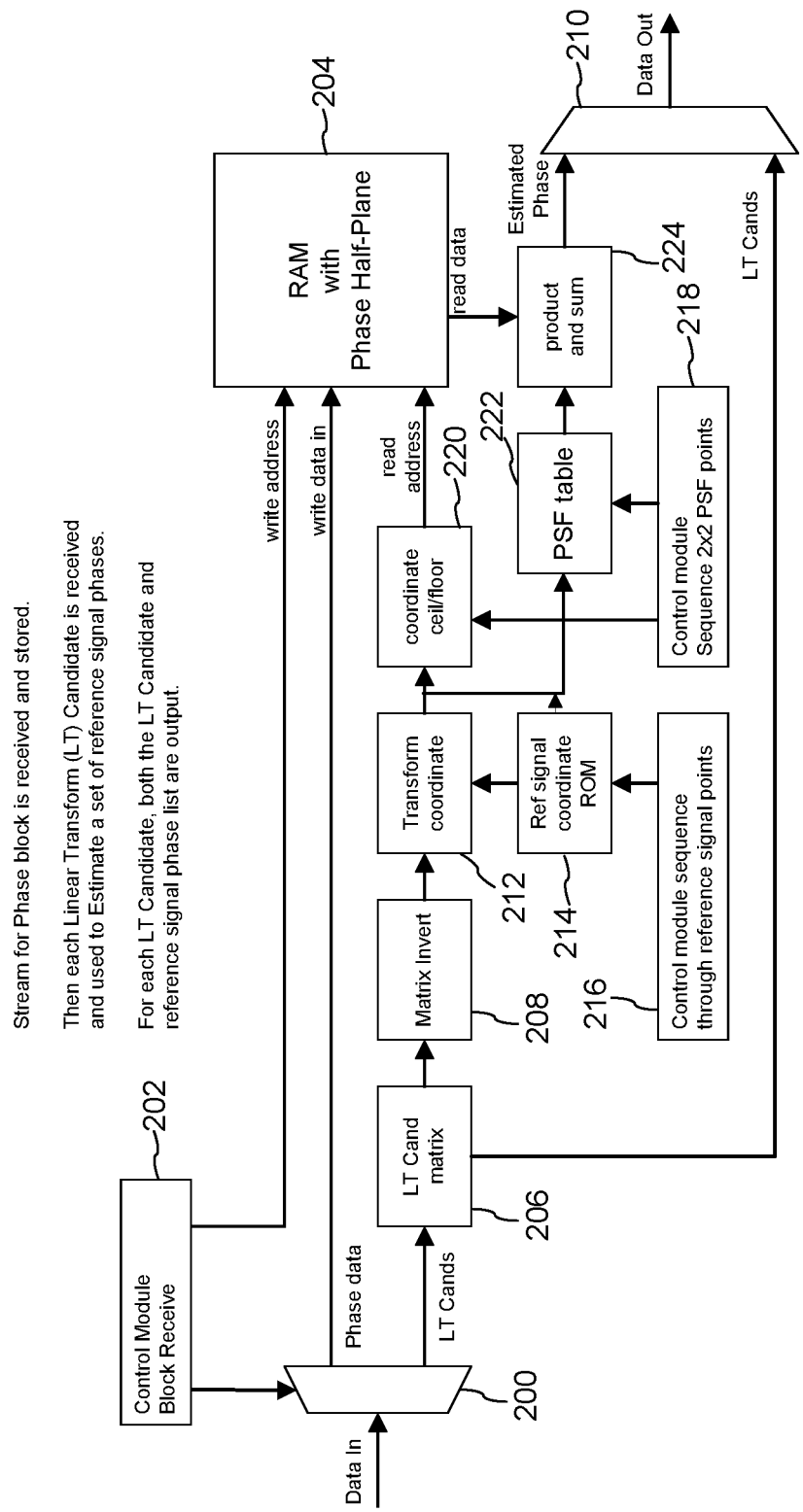
FIG. 10 is block diagram illustrating a digital logic circuit implementation of phase estimation.

FIG. 10 is a block diagram illustrating a digital logic circuit implementation of phase estimation. The phase estimation implementation shown in FIG. 10 receives a stream of phase information for a suspect signal block at data in module 200. Under control of control module 202, it stores the phase information (the phase half plane from a 2D FFT of the suspect signal block) in RAM memory 204. Linear transform candidates are also received through data in module 200 and stored directly in modules 206, 208 and 212 (alternatively, could be stored in RAM 204).

Linear transform candidate matrix module 206 forms the linear transform candidates in a matrix and provides them to a matrix invert module 208 and data out module 210. Matrix invert module 208 inverts the linear transform matrix. In this implementation, the linear transform is for a spatial transform of the image. For mapping the reference signal coordinates in the suspect image frequency domain, it takes the inverse transpose of the linear transform. Transform coordinate module 212 then takes a reference signal coordinate specifying the location of a reference signal component from a memory (Read Only Memory (ROM) 214) and transforms the location to a coordinate in the coordinate space of the suspect signal block. Control module 216 sequences through each of the locations of the reference signal components, providing the coordinates in the frequency domain. For each reference signal coordinate, control module 218 sequences through a 2 by 2 matrix of Point Spread Function (PSF) points. As it does so, it controls a coordinate ceiling/floor function module 220 that operates on the transformed coordinate of the reference signal component, and it selects the PSF for that coordinate in PSF table 222. The coordinate ceiling/floor module 220 then selects the neighboring frequency locations in the phase information RAM 204, which in turn, outputs the phase information at the neighboring locations to product and sum logic operators 224. The product and sum operators 224 apply the point spread function from table 222 to the phase information to calculate the estimated phase. Data out module 210 then outputs the estimated phases for each reference coordinate of the reference signal, along with the corresponding linear transform candidate. The phase estimation implementation cycles through all of the linear transform candidates, providing a set of estimated phases for each reference signal component for each LT candidate.

Phase Deviation

Referring back to FIG. 1, the process following phase estimation is to use this estimate of the phase of the transformed reference signal to determine the translation between the reference and suspect signals. There are alternative approaches to computing the translation at this point. One approach is to perform phase correlation between the phase representations of the transformed reference signal and the suspect signal (this requires an inverse FFT operation). Below, we describe an alternative approach referred to as phase deviation.

2D Phase Deviation

Phase deviation is an alternative approach to estimating the translation between two images or signals in general. As compared to a phase correlation approach, it does not require the inverse FFT operation.

Figure 11:
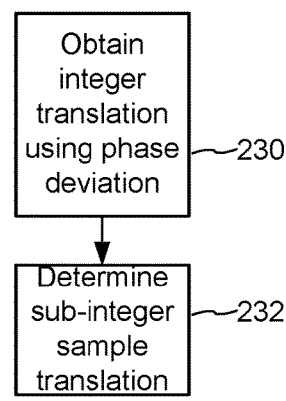
FIG. 11 is a flow diagram illustrating an overview of a phase deviation method.

FIG. 11 is a flow diagram illustrating an overview of a phase deviation method. The phase deviation method first obtains a set of candidate translation values (called the translation offsets) at a first level of detail (e.g., integer offsets) between the reference and suspect signals in step 230. In step 232 of FIG. 11, the phase deviation method refines these candidates by determining translation values that provide a better fit between the reference and suspect signals using a higher level of detail (e.g., fractional offsets) around the first set of candidate translations.

The phase deviation for a specified translation offset is the sum of deviations between the measured and the expected phases at all reference signal components of interest. In the case where the reference signal comprises a set of sinusoids, each with particular phase, the expected reference signal phases are the phases of the sinusoids at known translation offsets. These expected phases are provided for each of several translation offsets, which may be specified in terms of a phase angle or translation value (e.g., pixel offset at a particular image resolution). Stated another way, for each possible translation offset, there is a set of expected phases for the reference signal. Additionally, the other input is the measured phases, previously computed from the suspect signal. The deviation between the expected phases and the measured phases is computed for each translation offset. The deviation at each frequency can be calculated using a distance measure such as Euclidean distance between the measured and expected phases. The phase deviations calculated for all possible translation offsets constitute the 2D phase deviation surface. The location of the minimum value in the 2D phase deviation surface indicates the location of the translation offset.

A 2D phase deviation method can be implemented using just adds (no multiplies), and at a fraction of the computational cost of a 2D FFT. Also, the phase deviation calculations for each offset and for each frequency can be computed independently, leading to efficient parallel implementations. This is an advantage over alternative methods, like phase correlation.

The phase differences and deviations can either be computed as complex values or can be computed directly in terms of angles. Working with angles provides improved efficiencies in computation.

Distance measures other than the Euclidean distance can also be used. For example, the L1 norm or a nonlinear measure can provide improvements depending upon the specifics of the signals and noise involved.

In particular, the sum of deviations may be computed as the sum of absolute differences between the measured and expected phase angles, where each difference is wrapped between −pi and +pi, (modulo 2*pi). This computation is efficient to implement in hardware.

Sub-Sample Translation Estimation

Phase deviations can be computed for any arbitrary real valued translation offsets. This provides sub-sample translation estimation as opposed to integer valued translation estimation with the phase correlation approach.

The ability to compute a phase deviation metric at sub-sample translations can be used to implement a translation refinement technique where integer translations are first evaluated to determine suitable translation offsets around which further refinement is performed by evaluating sub-sample (i.e. fractional, sub-pixel for image content) translation offsets.

One Dimensional (1D) Phase Deviation

The basic phase deviation formulation can be modified to exploit patterns in the frequencies. Sets of frequencies for which the linear combination of coordinate values in one dimension (horizontal or vertical) is zero, lead to a 1D phase deviation formulation in the orthogonal dimension. Conceptually, this leads to hypothetical 1D signals in the orthogonal dimension which are a multiplication of the sets of 2D sinusoids in 2D space. The frequency of the hypothetical 1D signal is given by the sum of frequencies in the orthogonal dimension. Translation can then be estimated independently in each dimension using the 1D phase deviation formulation, for a fraction of the cost of 2D Phase Deviation. Besides, the search for a minimum phase deviation metric is along 1D (i.e. is on a one dimensional data set), further reducing the overall computational cost.

In some cases, the linear combinations lead to hypothetical 1D signals that are outside the support length (e.g. 128 points) of the original signal. These hypothetical 1D signals have a higher frequency than Nyquist. In this case, a 1D phase deviation method can be specified in terms of a larger artificial support length (e.g., using 256 points to ensure a higher sampling rate) to avoid aliasing. Avoiding aliasing increases reliability of translation estimation in noise.

1D phase deviation causes ambiguities in translation when all the resulting hypothetical frequencies in the orthogonal direction are even valued. For example, when pairs of quadrant symmetric frequencies of length 128×128 in 2D space (such as [−45, 9] and [45, 9], and, [−44, 6] and [44, 6]) are multiplied, the resulting 1D phase deviation has a periodicity of length 64. The frequency doubling caused by combining two frequencies of the same value leads to even valued 1D signal frequencies (e.g., 18 and 12), thereby introducing ambiguity. As a corollary to aliasing, mixing two frequencies A and B, produce new frequencies A+B and A−B. The ambiguity caused by periodicity can be resolved using 2D phase deviation for further evaluation of specific translations. Alternatively, the ambiguity can be avoided by ensuring that a substantial number (around half) of the hypothetical frequencies are odd valued.

A combination of 1D phase deviation and 2D phase deviation can be employed to take advantage of the meager computational load of 1D phase deviation and the robustness of 2D phase deviation.

Figure 12:
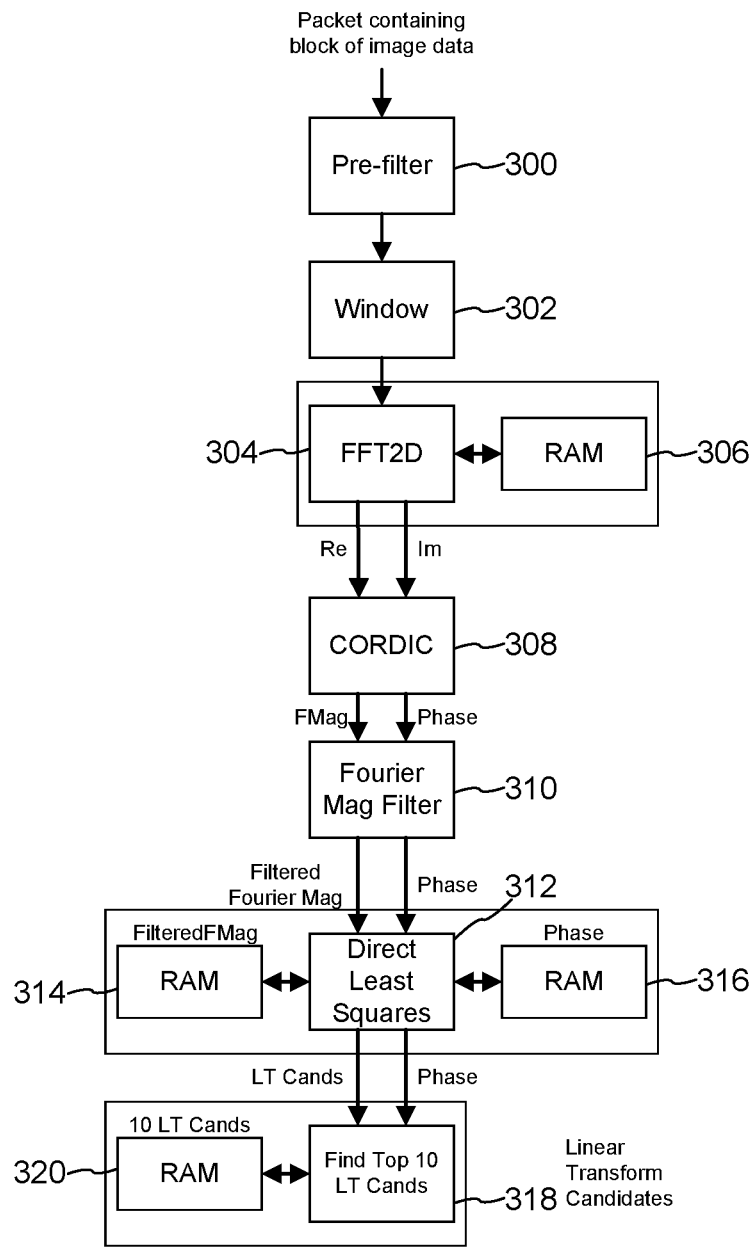
FIG. 12 is a block diagram of a digital logic circuit for estimating a linear transform.
Figure 13:
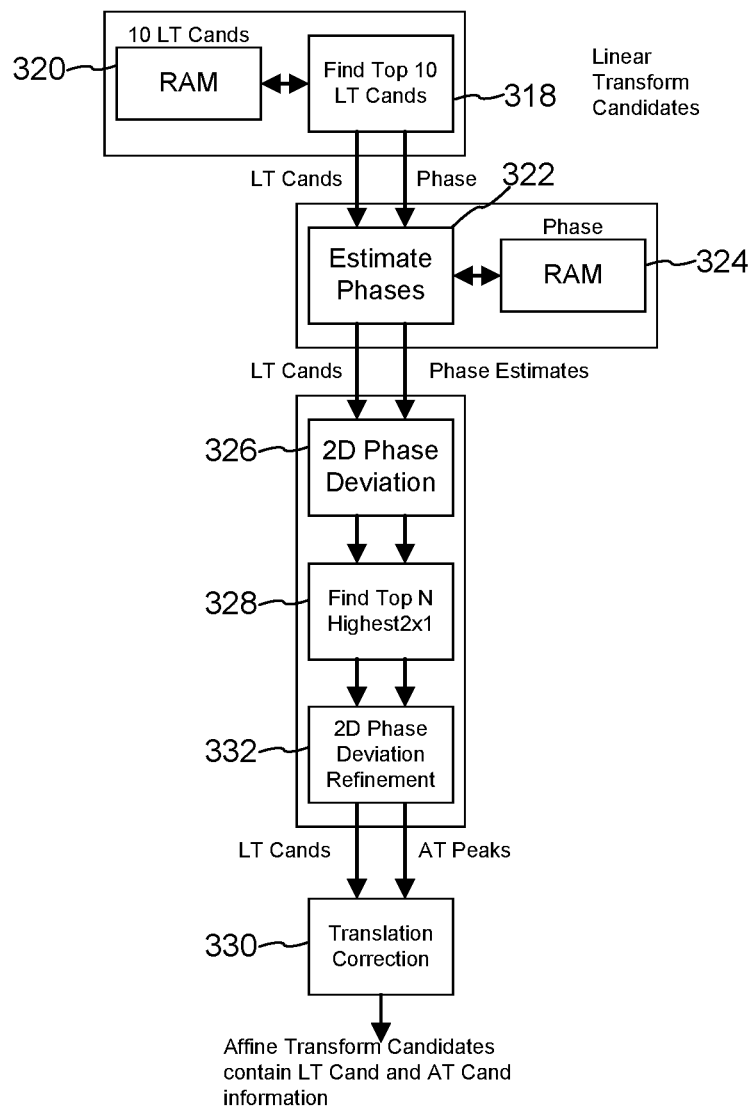
FIG. 13 is a block diagram of a digital logic circuit for phase estimation and phase deviation.

FIGS. 12 and 13 are block diagrams illustrating hardware implementations in more detail. FIG. 12 is a block diagram of a digital logic circuit for estimating a linear transform (e.g., block 102 in FIG. 1 and blocks 122-124 in FIG. 2). FIG. 13 is a block diagram of a digital logic circuit for phase estimation and phase deviation (e.g., blocks 102-104 in FIG. 1 and block 126 in FIG. 2).

As shown in FIG. 12, the input to the implementation is a packet of image data from the suspect image. The implementation computes the affine transform of a digital watermark signal embedded in the input image, which is the suspect image, relative to the initial coordinate space of the digital watermark, which is the reference signal. In this particular example, the reference signal is a set of frequency peaks corresponding to the watermark signal (namely, a set of sinusoids with a known, pseudorandom phase relative to each other). At this point in the process, the suspect image may have been subjected to various forms of distortion caused by sampling (scanning, printing, etc.) as well as geometric distortions (e.g., as a result of image editing and/or capture of the image in a transformed state from a scanner or camera). As a result of this distortion, the affine transform that best approximates the transformation between the known reference signal and its counterpart embedded in the suspect image is not known. The objective is to compute the affine transform that best approximates the transformation between the reference signal at the time of embedding, and the embedded reference signal within the suspect image.

Before describing the circuit implementation, it is helpful to provide background on the attributes of the reference and suspect signals because they dictate design considerations for the hardware. The digital watermark has been repeated within adjacent blocks (e.g., in a tiled fashion) of the signal. The digital hardware circuitry operates on a stream of input packets. The input packets comprise overlapping blocks of the suspect image that roughly correspond to the original size of the blocks into which the watermark was originally embedded. Each block is a 128 by 128 array of pixels. The size of memory and FFT filters etc. are adapted based on these signal attributes, and can vary with the application and signal specifications for those applications.

The pre-filter 300 filters the pixel values within the image block using the method described previously. Namely, each sample is compared with its eight neighbors and replaced by a value that is a function of these comparisons to provide a form of non-linear filtering that seeks to isolate the embedded reference signal from the suspect image data.

The window operation 302 prepares the filtered image data for a 2D FFT. The resulting filtered image data block is received by FFT2D (304) and stored in RAM. In this case, the RAM (306) is implemented within an ASIC along with the other hardware components shown in FIG. 12. FFT2D processes a block of spatial input data to produce complex frequency data. The Real and Imaginary parts of complex frequency data are interleaved in output into a single pipe output stream.

CORDIC 308 converts interleaved Real (Re) and Imaginary (Im) stream into interleaved magnitude and phase stream. As known in the field, CORDIC is a method for efficient digital signal processing implementation of trigonometric functions. A Fourier Magnitude Filter 310 filters only the Fourier Magnitude portion of the data. The filter uses a ratio of the sample value to the average of its 8 neighbors (in the Fourier magnitude domain). The output of the filter is then a function (in this case, a nonlinear function) of this ratio. The phase is passed through un-altered.

The Direct Least Squares (DLS) module 312 receives an interleaved stream of the Filtered Fourier Magnitude and Phase data. Each of these data streams is stored in a RAM, shown as RAM blocks 314 and 316.

DLS computes and refines each potential linear transform candidate for maximum correlation strength. The output of the DLS module 312 is a stream of linear transform (LT) candidates, preceded by the stored phase block. Phase data used for phase estimation is stored in a form that is ready to be sampled so that phases can be estimated for each candidate linear transform.

Block 318 sorts the input stream of linear transform candidates to find the top 10 candidates, based on a measure of correlation. This measure of correlation, in this implementation, is a correlation strength computed as the dot product between the reference and suspect signals after the linear transform candidate is used to align these signals. RAM 320 is a memory used to store the top linear transform candidates and corresponding correlation metrics.

FIG. 13 starts where FIG. 12 ends with the top linear transform candidates. The phase estimation module 322 receives the stream of phase data and stores it in RAM 324. It uses each of the linear transform candidates to estimate a set of phases for signal components in the suspect image corresponding to each of the frequency locations in the reference signal. For each linear transform candidate, the phase estimation module provides both the linear transform candidate and a set of phases corresponding to the frequency locations in the reference signal. These phases represent a measure of the phases of the reference signal component that is embedded in the suspect signal. In particular, for this implementation where the reference signal is embedded into the suspect signal as a digital watermark, the set of phases represent the estimates of the phases of the embedded reference signal components, which correspond to sinusoids with random phase.

In other implementations, the phase estimation module may be subsumed within the DLS module, since much of the matrix calculations to transform reference signal coordinates are already computed there, and the phase data is also readily available. This will result in the DLS module outputting both linear transforms and estimated phases for each of those transforms.

While the phase estimation method is depicted for a digital watermark detector implementation, the method is applicable to other applications where a signal processor seeks to find a known reference signal within a suspect signal. Examples include object recognition and pattern matching, where the signal processor seeks to find a known reference signal in an image. The phase estimation method enables the signal processor to compute estimates of the phase of a reference signal that is suspected to be a component of the suspect image. These phase estimates can then be used in additional matching or recognition operations to detect whether the reference signal is present in the suspect signal. In these methods, the same general approach is followed: the phase estimation uses an estimate of the transform between an expected signal pattern and corresponding components in a suspect signal, along with the phase of the suspect signal to compute estimates of the phase of the signal pattern in the suspect image.

Returning to FIG. 13, the phase deviation module 326 receives each linear transform candidate and a corresponding set of estimated phases of the reference signal in the suspect signal. The phase deviation module 326 computes a phase deviation surface for each linear transform candidate. This surface is an array of phase deviations, where each element in the array corresponds to a translation offset and the value of the element is sum of phase deviation metrics between corresponding expected and measured phase differences. For 2D phase deviation, this is a 2D array of phase deviation values corresponding to all pairs of translation offsets (e.g., a surface of 128 by 128 values). As described previously, the phase deviation for a particular translation offset is computed as a sum of a difference metric that calculates the deviation between an expected phase difference and the measured phase difference at a particular reference signal component. For our implementation, there are four orientations for each linear transform candidate, corresponding to orientations of 0, 90, 180 and 270 degrees. At the end of computing the phase deviation surface for an orientation, phase registers are re-oriented by 90 degrees.

The objective of the 2D phase deviation module is to provide one or more translation offset candidates corresponding to minima in phase deviation. Stated another way, the objective is to find the translation offset that best matches the expected and measured phase differences, as determined by the minimum deviation between the two. The implementation subtracts the phase deviation from a large constant to convert the problem of searching for minima to a problem of searching for peaks for convenience (in this case, a peak represents a minimum phase deviation metric in the phase deviation surface). Since the objective is to find the best matches between the expected and measured signals (i.e. the known reference signal and its counterpart in the suspect image), the hardware seeks to find peaks in the deviation between the two. The initial 2D phase deviation surface is computed for integer translation offsets for computational efficiency. However, the actual translation might lie at a fractional (i.e., sub-pixel) offset. As a result, peaks in the inverted phase deviation surface might be spread over a 2 by 1 pixel region (in either the horizontal or vertical direction). To overcome this effect, peaks are searched over 2×1 regions in the Highest2×1 module 328.

To overcome the effects of noise and distortion, the top N peak candidates are further evaluated using a refinement module 332.

The refinement module begins with the top N peaks (e.g., 2 by 1) peaks identified in the inverted 2D phase deviation surface (e.g., the greatest minimum in magnitude in the phase deviation surface). The value of N is determined as a tradeoff between computational efficiency and robustness and is typically between 2 and 10. Then, for each of these N peaks, it computes a refined phase deviation surface in a neighborhood around the translation offset corresponding to the peak. These refined phase deviations are computed for sub-pixel translation offsets. In particular, the expected phase differences are computed for each of the sub-pixel translations in a M by M array around the integer translation offset location of a peak. The value of M and the fractional (i.e., sub-pixel) increments in translation are determined based on the desired computational throughput and robustness. A typical value for M is 16, while a typical fractional increment is a quarter pixel. The sum of phase deviations is calculated to provide the sub-pixel phase deviation surface. If there is a sub-pixel offset with a higher peak, this sub-pixel offset is included in a list of the top peaks.

The output of the 2D phase deviation module is a linear transform candidate followed by a list of peak coordinates corresponding to minima in the phase deviation surface (including any surfaces computed in the refinement stage).

The translation correction module 330 corrects the translation offset computed for each of the linear transform candidates. The nature of the correction is specific to the implementation and depends on implementation details such as, whether the reference signal phases used as inputs are expressed relative to Fourier representation block center or block corner, and Fourier processing and representation relative to block center or corner, as well as differences in the translation depending whether it is represented relative to the coordinate system of the transformed suspect signal or the reference signal.

FIG. 14 is a diagram illustrating a phase deviation equation based on a deviation metric. This diagram provides an example of a phase deviation metric. This metric is one example illustrating how to compute phase deviation values in the phase deviation surface. As shown in FIG. 14, phase deviation represents the deviation between a measured phase difference and expected phase difference for a particular frequency component, i, of the reference signal. The measured phase difference is the difference between the phase angle at frequency component, i, for the estimated phase of the reference signal in the suspect signal (e.g., as determined by the phase estimation process) and the known phase angle of the reference signal component. As noted previously, the phase estimation process provides a phase angle estimate for the suspect signal in the transformed state. In the implementation, the phase angle used for the known reference signal is in its original, un-transformed state.

The expected phase difference is directly computed from the horizontal and vertical translation offsets. As noted, these offsets start out as integer offsets, and then are sub-integer (e.g., sub-pixel) for refinement.

Note that in the equation that there are M frequency components in the reference signal. The deviation metric is a sum of the individual deviations for each of the frequency components. While the Euclidian distance measure is shown, other deviation metrics may be used as previously indicated.

From the depiction in FIG. 14, one can see that the 2D case shown can be reduced to 2 separate instances of 1D phase deviation by using a reference signal that has pairs of frequency components that are symmetric about the vertical axis, and thus, the horizontal components cancel each other, and likewise, have pairs of frequency components that are symmetric about the horizontal axis, and thus, the vertical components cancel each other. As noted, this enables the vertical and horizontal translation offsets to be determined separately in independent searches for the peak in the respective 1D phase deviation arrays.

Figure 15:
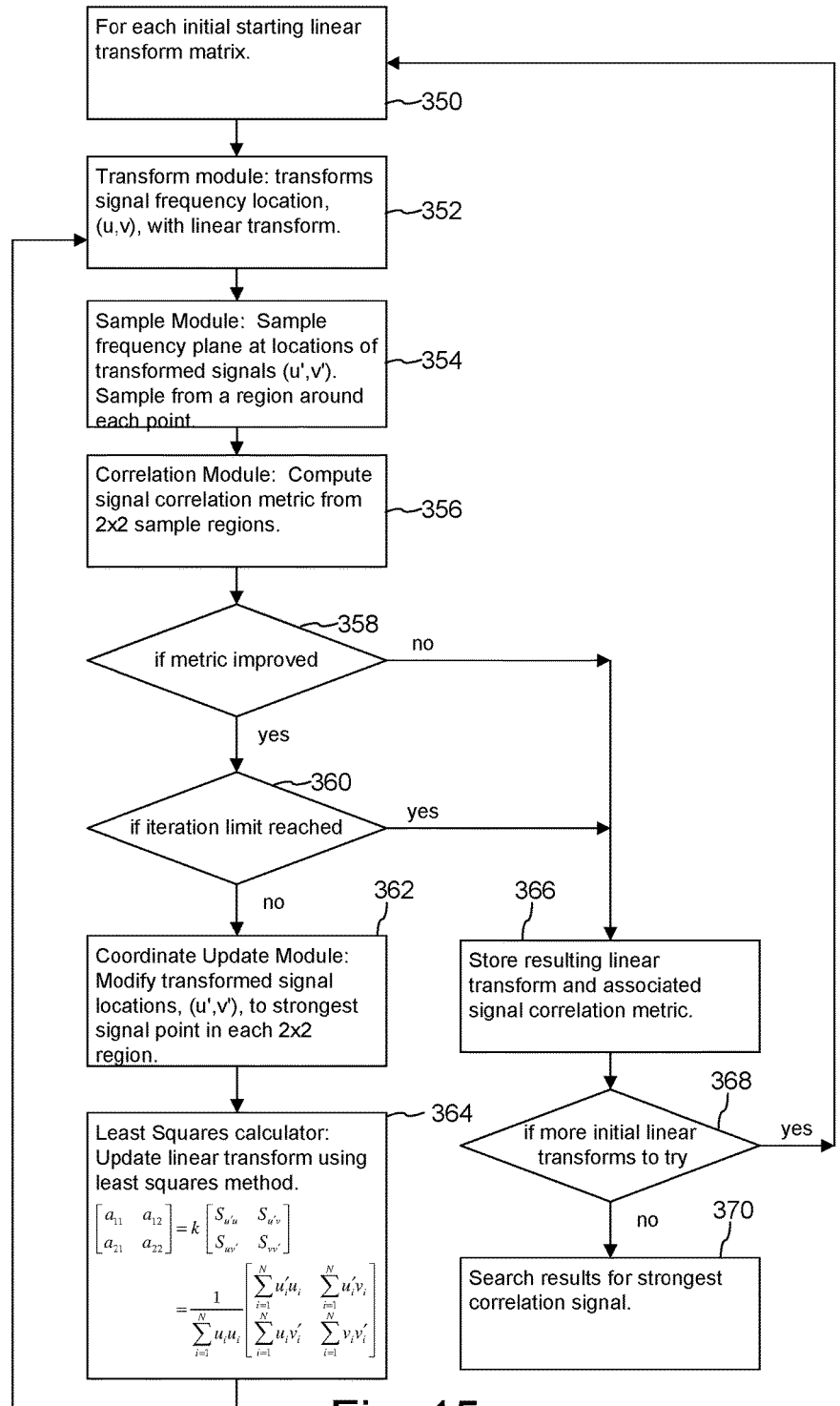
FIG. 15 is a diagram illustrating an implementation of a direct least squares method.

FIG. 15 is a diagram illustrating an implementation of a DLS method. This is an implementation of the processing within, for example, block 312, in FIG. 12. As noted previously, the DLS module begins with a set of seed linear transform candidates in block 350. For example, this implementation begins with a sparse set of rotation-scale candidates (as noted in one example above), which comprise subset of the linear transform parameters represented in a 2 by 2 linear transform matrix. The other linear transform parameters represented in a 2 by 2 matrix include differential scale (e.g., horizontal and vertical scales) and shear (e.g., horizontal and vertical shear). When the DLS method starts with rotation and scale candidates, the other parameters are initially assumed to not provide any additional transformation, and subsequent iterations of the method update the linear transform in a manner that enables the other linear transform parameters to vary so as to provide a better fit between the reference and suspect signal. In other implementations, a different subset or formulation of sparse linear transform candidates may be chosen as seed candidates.

For each linear transform candidate in the starting set of seed candidates, a transform module in the DLS module transforms the frequency locations of the frequency components in the reference signal (352). A sample module then samples the frequency plane of the suspect signal at locations in a neighborhood around the location of each transformed location (354). The neighborhood is a region surrounding the transformed frequency location, and in practice it encompasses some number of discrete frequency locations in the FFT of the suspect signal. Next, a correlation module in the DLS module computes a signal correlation metric (356) that provides a measure of correlation between the reference signal and the suspect signal for these regions in the suspect signal around each transformed component of the reference signal. At the end of this process, the DLS module has a signal correlation metric for the linear transform candidate. It determines whether this metric is improved relative to a previously stored metric for a prior iteration (358). The DLS module continues so long as there is improvement in the correlation metric (358) and an iteration limit is not met (360).

There are a variety of ways to compute regions and the signal correlation metric computed for those regions. In one implementation in which the DLS module samples from the four nearest neighbor locations, the signal correlation metric is computed as a sum of the bi-linear interpolation of the frequency magnitudes at those neighbors for each transformed location within the suspect signal. Alternatives include computing correlation using a bi-cubic interpolation, and using a 3 by 3 sample region around each transformed frequency component's location. The correlation can also incorporate a correlation of the phase components of the reference and suspect signals at the regions. In this case, the phases in the suspect signal are estimated using the phase estimation method.

In the case where the DLS module finds a linear transform candidate that improves upon the signal correlation and is below the iteration limit, the DLS module proceeds to establish a set of inputs to a least squares calculator, which in turn, computes a new candidate linear transform. This set of inputs comprises a set of frequency component locations corresponding to each transformed frequency component location, where there is a maximum in frequency magnitude. The process of finding these new locations for each component of the reference signal is reflected in block 362. In particular, a coordinate update module computes feature coordinates (e.g., peaks) in a neighborhood around the transformed coordinate locations. Next, the least squares calculator (364) computes a new linear transform candidate by using the least squares method to find a linear transform that best maps the reference signal components from their original locations to the new locations found in block 362.

The process depicted in block 362 is an implementation of "Coordinate Update" discussed above. One approach to updating the coordinates of a frequency component of the reference signal is to select the coordinates of the neighboring frequency location with the maximum magnitude in a neighboring region, such as a 2 by 2, 3 by 3, 5 by 5, etc. sample region around the transformed frequency location. This process does not require interpolation to find new coordinates. In some implementations, we have found that a 3 by 3 neighborhood covers differential scale up to 2-3% and sometimes up to 5%. There is a trade-off between using a larger neighborhood and potential confusion due to noise of adjacent frequency components of the reference signal. Our implementations use a reference signal where M is in the range of 35-75, the suspect image is sampled around a resolution of 100 dots per inch (DPI), and the block size and FFT size is 128 by 128 samples. The neighborhood sizes and shapes can be tailored for the unique characteristics of the reference signal. Neighborhood sizes can increase with increasing frequency. The neighborhood size and shape can be tailored to avoid conflict of noise due to adjacent frequency components in the reference signal. The neighborhood size and shape can also be adapted as a function of the linear transform candidate (e.g., transformed by the LT candidate). The update to the coordinate of a transformed location can also be computed as combination of neighboring values, such as by finding the center of a neighboring peak (e.g., a Normalized Center of Mass), a Center of Mass, a quadratic fit, or other interpolation of neighboring values.

The least squares calculator of block 364 implements the expression shown in the diagram to solve for the 2 by 2 linear equation on the left hand side of the expression. This is implemented in hardware using multiply and add logic circuitry, and of course, can be implemented in software (including firmware instructions). As shown, the inputs are the coordinates of the reference signal components and the corresponding updated coordinates for the reference signal in the suspect signal as determined from the previous block (362).

After computing the update of the linear transform candidate in block 364, the DLS modules adds this linear transform as a new candidate and returns to block 352.

When the DLS module completes as determined in decision blocks 358-360, the resulting linear transform candidate and its associated signal correlation metric are stored for further processing (366). The DLS module repeats for additional seed linear transform candidates as shown in block 368. When the initial candidates have been processed and refined as shown, the DLS module has a refined linear transform candidate for each initial seed candidate. It searches this set of refined linear transform candidates for the strongest correlation. A subset of the top candidates based on correlation can then be used in further processing as noted. Also, as noted previously, linear transform candidates can be clustered and combined to form new linear transform candidates.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for DLS, phase estimation and phase deviation may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to determine linear transforms, phase shift and translation between signals.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

We claim:

1. A method of determining a geometric transformation of an image, the method comprising:
   receiving an electronic image sampled from a physical object;
   with one or more processors:
   determining a candidate geometric transform between a digital watermark signal and the electronic image;
   refining the candidate geometric transform by transforming coordinates of the digital watermark signal with the candidate geometric transform, determining peak locations within the electronic image that are within a neighborhood of the transformed coordinates of the digital watermark signal, updating locations of the transformed coordinates to the peak locations, determining a new geometric transform that maps the digital watermark signal to the updated locations, and determining whether correlation has increased between the electronic image and the digital watermark signal, transformed by the new geometric transform;

from the electronic image, estimating phase at non-integer coordinates corresponding to coordinates of the digital watermark signal transformed with the new geometric transform; and determining deviation between estimated phase and expected phase of the digital watermark signal.

2. The method of claim 1 wherein the candidate geometric transform comprises two or more affine transform parameters.

3. The method of claim 2 wherein the two or more affine transform parameters comprise rotation, differential scale and shear.

4. The method of claim 1 wherein the digital watermark signal comprises peaks at the coordinates of the digital watermark signal.

5. A digital watermark detector comprising:
a memory for storing an electronic image sampled from a physical object;
a processor in communication with the memory, the processor configured to obtain a candidate geometric transform, and configured to refine the candidate geometric transform by transforming coordinates of the digital watermark signal with the candidate geometric transform, determining peak locations within the electronic image that are within a neighborhood of the transformed coordinates of the digital watermark signal, updating locations of the transformed coordinates to the peak locations, determining a new geometric transform that maps the digital watermark signal to the updated locations, and determining whether correlation has increased between the electronic image and the digital watermark signal, transformed by the new geometric transform;
the processor further configured to obtain phase estimates of a digital watermark signal in the electronic image by estimating phase at non-integer coordinates corresponding to coordinates of the digital watermark signal transformed with the new geometric transform, the estimating employing point spread function parameters to estimate phase at the non-integer coordinates based on frequency domain data at neighboring integer coordinates; and
the processor further configured to determine deviation between estimated phase and expected phase of the digital watermark signal.

6. The digital watermark detector of claim 5 wherein the candidate geometric transform comprises rotation, differential scale, and shear.

7. The digital watermark detector of claim 5 wherein the digital watermark signal comprises peaks at the coordinates of the digital watermark signal.

8. A non-transitory, computer readable medium on which is stored instructions, which, when executed by a processor, perform a method of determining a geometric transformation of an image, the method comprising:
obtaining an electronic image sampled from a physical object;
determining a candidate geometric transform between a digital watermark signal and the electronic image;
refining the candidate geometric transform by transforming coordinates of the digital watermark signal with the candidate geometric transform, determining peak locations within the electronic image that are within a neighborhood of the transformed coordinates of the digital watermark signal, updating locations of the transformed coordinates to the peak locations, determining a new geometric transform that maps the digital watermark signal to the updated locations, and determining whether correlation has increased between the electronic image and the digital watermark signal, transformed by the new geometric transform;
from the electronic image, estimating phase at non-integer coordinates corresponding to coordinates of the digital watermark signal transformed with the new geometric transform; and
determining deviation between estimated phase and expected phase of the digital watermark signal.

9. The computer readable medium of claim 8 wherein the candidate geometric transform comprises two or more affine transform parameters.

10. The computer readable medium of claim 9 wherein the two or more affine transform parameters comprise rotation, differential scale and shear.

11. The computer readable medium of claim 8 wherein the digital watermark signal comprises peaks at the coordinates of the digital watermark signal.

12. The computer readable medium of claim 8 further comprising instructions that configure a processor to perform acts of: estimating phase of the digital watermark signal, when transformed by the geometric transform, by sampling phase from neighboring image samples at integer locations within the electronic image signal, and using the phase estimates of the digital watermark signal to assess whether the geometric transform improves correlation between the electronic image and the digital watermark signal, as transformed by the geometric transform.

* * * * *